(12) United States Patent
Tollhupp

(10) Patent No.: US 7,063,012 B2
(45) Date of Patent: Jun. 20, 2006

(54) METHOD FOR MARKING BY PAD-PRINTING AND SUBLIMATION, AND SUBLIMABLE PAD-PRINTING INKS

(75) Inventor: Michel Tollhupp, Beaune (FR)

(73) Assignee: Gaming Partners International, Savigny les Beaune (FR)

( * ) Notice: Subject to any disclaimer, the term of this patent is extended or adjusted under 35 U.S.C. 154(b) by 420 days.

(21) Appl. No.: 10/259,405

(22) Filed: Sep. 30, 2002

(65) Prior Publication Data

US 2004/0014838 A1  Jan. 22, 2004

(30) Foreign Application Priority Data

Jul. 22, 2002 (FR) .................................. 02 09259

(51) Int. Cl.
B41F 17/00 (2006.01)

(52) U.S. Cl. .......................... 101/35; 101/41; 101/170; 101/163

(58) Field of Classification Search ................. 101/41, 101/35; 351/162
See application file for complete search history.

(56) References Cited

U.S. PATENT DOCUMENTS

| 1,475,652 A | 11/1923 | Polizzi |
| 2,748,696 A | 6/1956 | Murray |
| 3,766,452 A | 10/1973 | Burpee et al. |
| 3,868,902 A | 3/1975 | Bradshaw et al. |
| 3,904,791 A | 9/1975 | Iverson et al. |
| 3,916,784 A | 11/1975 | Dubuit |
| 3,951,892 A | 4/1976 | Drury, Jr. et al. |
| 3,953,932 A | 5/1976 | Graves |
| 3,968,582 A | 7/1976 | Jones |
| 4,019,436 A | 4/1977 | Mandweiler et al. |
| 4,078,482 A | 3/1978 | Goerig et al. |
| 4,163,813 A | 8/1979 | Sheets et al. |
| 4,435,911 A | 3/1984 | Jones |
| 4,508,031 A | 4/1985 | Rajnik |
| 4,530,286 A | 7/1985 | Samuels |
| 4,726,006 A | 2/1988 | Benne |
| 4,747,093 A | 5/1988 | Benne |
| 4,814,589 A | 3/1989 | Storch |
| 4,889,366 A | 12/1989 | Fabbiani |
| 4,925,705 A | 5/1990 | Hill |
| 5,165,340 A | 11/1992 | Karlyn et al. |
| 5,166,502 A | 11/1992 | Rendleman et al. |

(Continued)

FOREIGN PATENT DOCUMENTS

EP  0083808  7/1983

(Continued)

OTHER PUBLICATIONS

English Language Abstract of E.P.O. 0 570 607.

(Continued)

*Primary Examiner*—Andrew H. Hirshfeld
*Assistant Examiner*—Marissa Ferguson
(74) *Attorney, Agent, or Firm*—Greenblum & Bernstein, P.L.C.

(57) ABSTRACT

Sublimable pad-printing ink and a method of marking an object with the ink, wherein the ink includes a hardening transparent pad-printing ink base and at least one sublimable colored pigment. The hardening transparent pad-printing ink base resists a sublimation temperature of the at least one sublimable colored pigment. The method includes pad-printing the object with a marking that includes a monochrome or polychrome marking composition having at least one monocolor pigmented component including fine particles of at least one sublimable monocolor colored pigment and heating at least one of the object and the pad-printed marking composition.

47 Claims, 3 Drawing Sheets

U.S. PATENT DOCUMENTS

| | | | |
|---|---|---|---|
| 5,228,692 A | 7/1993 | Carrick et al. | |
| 5,361,885 A | 11/1994 | Modler | |
| 5,403,039 A | 4/1995 | Barowske et al. | |
| 5,406,264 A | 4/1995 | Plonsky | |
| 5,466,010 A | 11/1995 | Spooner | |
| 5,794,532 A | 8/1998 | Gassies et al. | |
| 6,148,721 A | 11/2000 | Hellmeier et al. | |
| 6,176,185 B1 | 1/2001 | Charlier et al. | |
| 6,270,837 B1 * | 8/2001 | Liu et al. | 427/180 |
| 6,314,880 B1 * | 11/2001 | Lampinski | 101/170 |
| 6,467,413 B1 | 10/2002 | Charlier et al. | |
| 6,612,940 B1 * | 9/2003 | Nesbitt et al. | 473/376 |
| 6,683,122 B1 * | 1/2004 | Zilg et al. | 523/205 |
| 2003/0106442 A1 * | 6/2003 | Gosetti | 101/35 |

FOREIGN PATENT DOCUMENTS

| | | | |
|---|---|---|---|
| EP | 0197590 | | 10/1985 |
| EP | 0251253 | | 1/1988 |
| EP | 0337921 | | 10/1989 |
| EP | 0365018 | | 4/1990 |
| EP | 0375062 | | 6/1990 |
| EP | 0570607 | | 11/1993 |
| EP | 0581378 | | 2/1994 |
| FR | 2463683 | | 2/1981 |
| FR | 2501594 | | 9/1982 |
| FR | 2730392 | | 8/1996 |
| FR | 2774326 | | 8/1999 |
| GB | 1517832 | | 7/1978 |
| GB | 2076338 | | 12/1981 |
| JP | 359138277 | * | 8/1984 |
| JP | 60030344 | | 2/1985 |
| JP | 63280639 | | 11/1988 |
| WO | 87/00796 | | 2/1987 |
| WO | 93/08565 | | 4/1993 |
| WO | 93/22746 | | 11/1993 |
| WO | 95/19266 | | 7/1995 |
| WO | 98/43816 | | 10/1998 |

OTHER PUBLICATIONS

English Language Translation of EP 0 570 607.
Patent Abstracts of Japan, vol. 13, No. 83 (M-802).
Patent Abstracts of Japan, vol. 9, No. 152 (M-391).
Copy of Electronic Information Disclosure Statement, with acknowledgement receipt.
U.S. Appl. No. 10/160,347, filed Jun. 4, 2002.

* cited by examiner

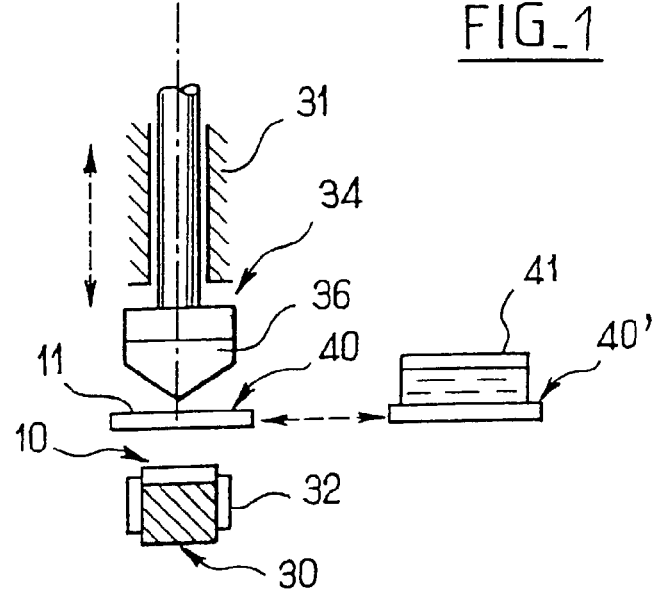
FIG_1
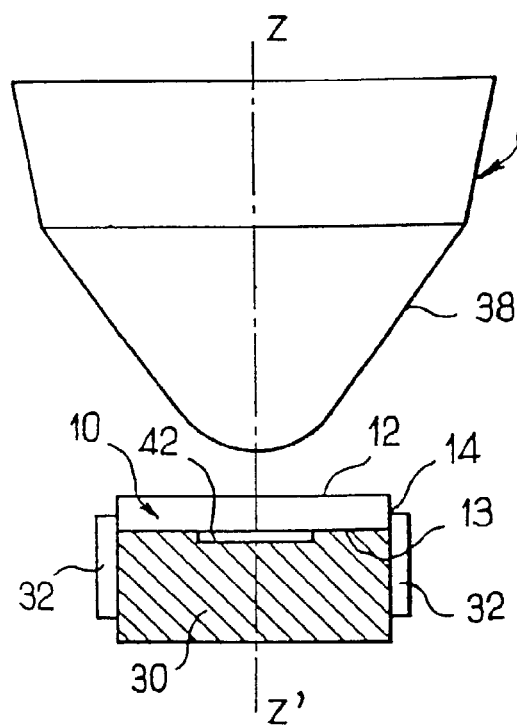
FIG_2a
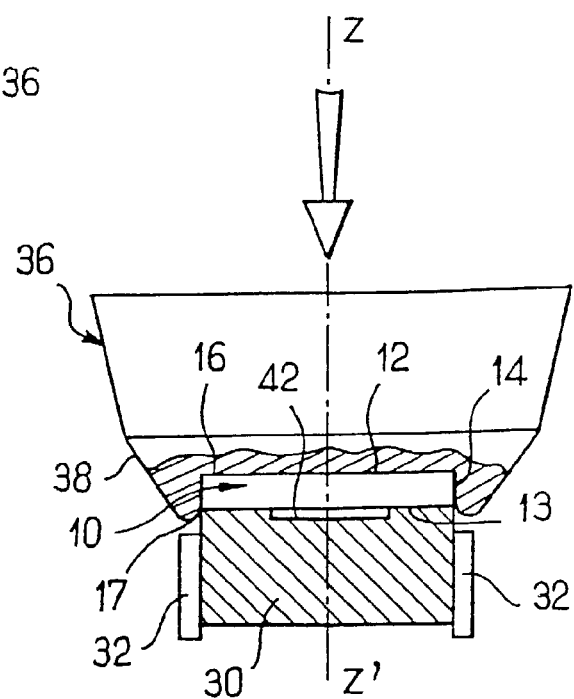
FIG_2b

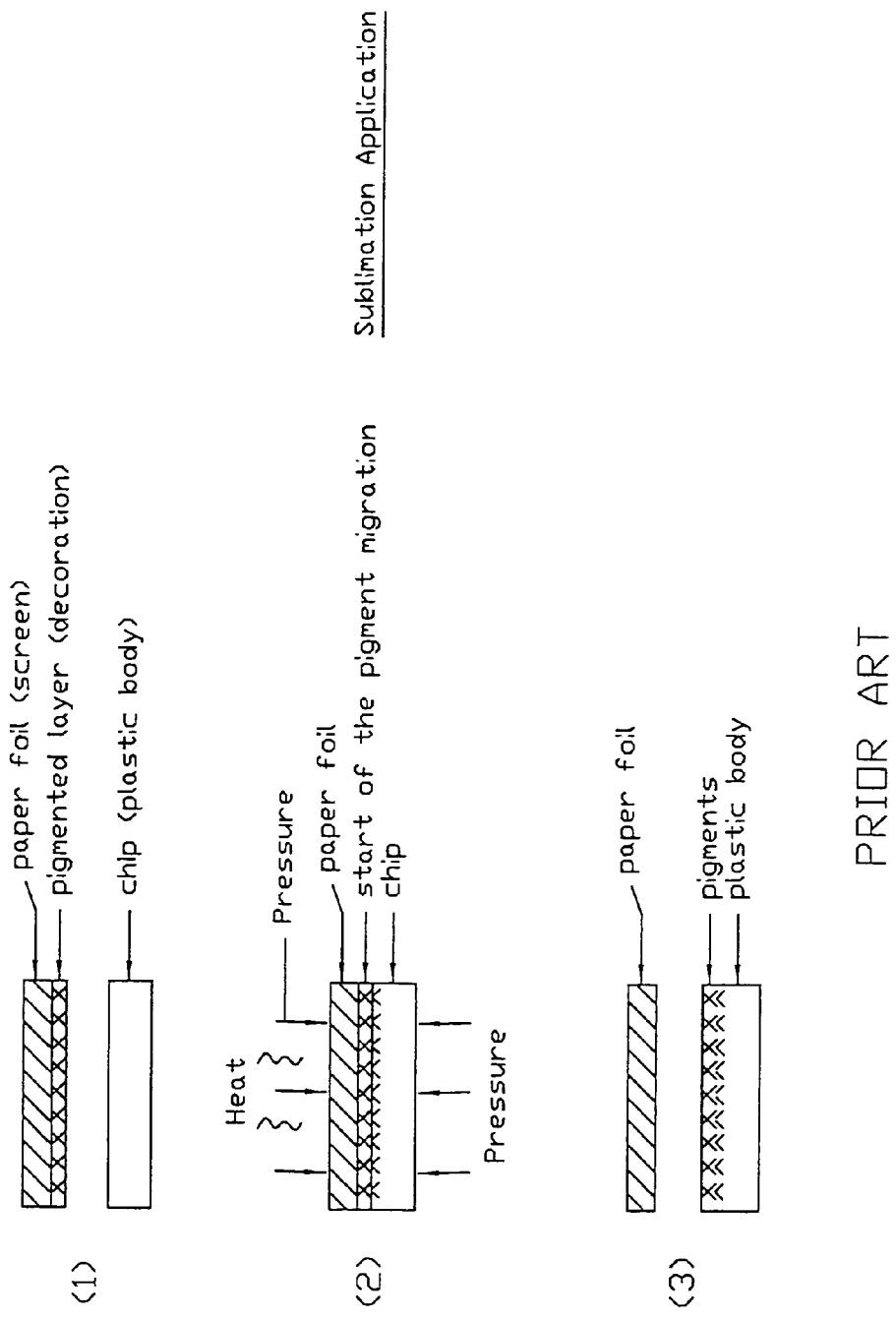

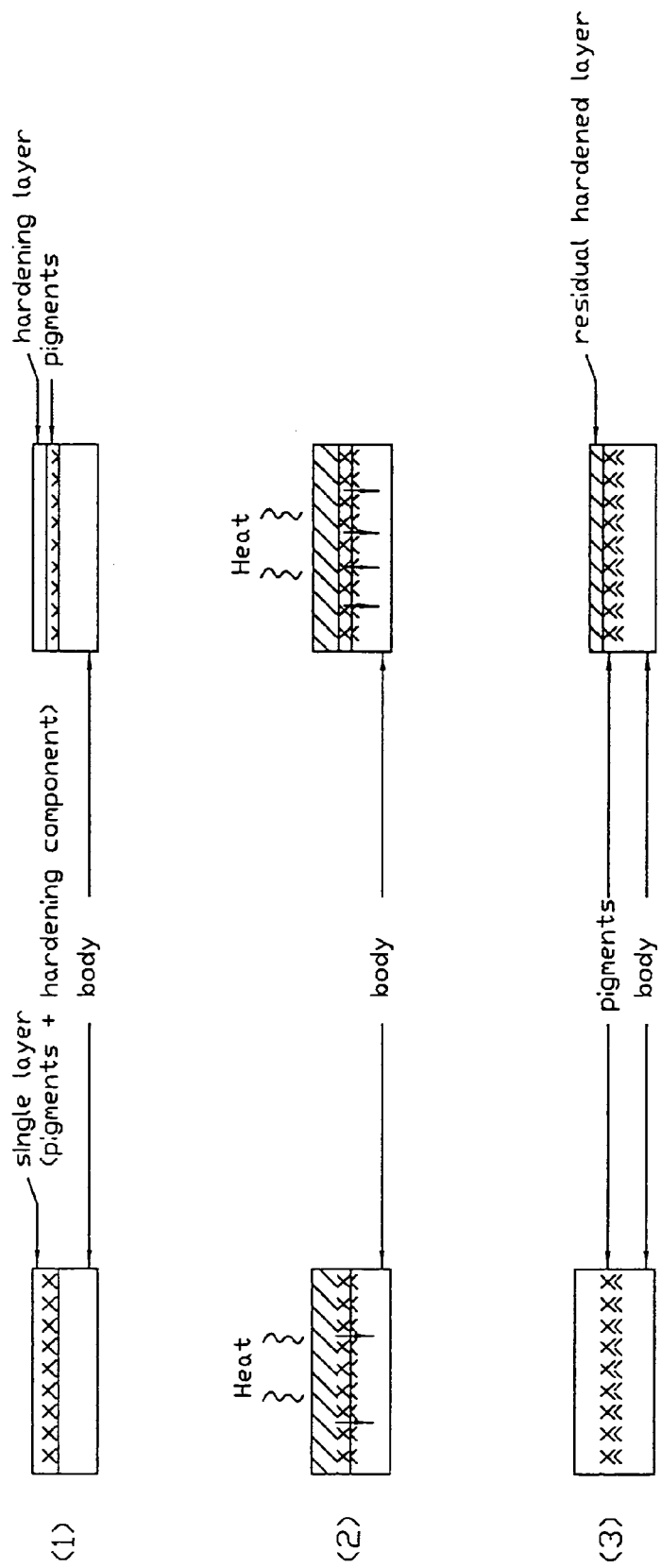

METHOD FOR MARKING BY PAD-PRINTING AND SUBLIMATION, AND SUBLIMABLE PAD-PRINTING INKS

CROSS-REFERENCE TO RELATED APPLICATIONS

The present application claims priority under 35 U.S.C. § 119 of French Application No. FR 02 09259, filed on Jul. 22, 2002, the disclosure of which is expressly incorporated by reference herein in its entirety.

BACKGROUND OF THE INVENTION

1. Field of the Invention

The present invention generally relates to the marking of a decoration on an object, such as, by way of a non-limiting example, a gambling chip having the shape of a disk or a plate. A gambling chip, also referred to as a casino chip, should be understood as any element that can be used in a gambling hall, and represents a nominal value which may or may not be predetermined. Generally speaking, these chips are made of a rigid and scratch-resistant plastic.

2. Discussion of Background Information

Gambling chips are, almost systematically, given a decoration by marking on their faces and/or sides, and this decoration, depending on the end uses of the chips, possibly ranging from the simplest to the most complex. In the following disclosure, the term "decoration" should be understood in its broadest sense and includes any design, symbol, mark and characters (for example, letters, numerals, bar codes or various codings) capable of graphical representation and/or visual or optical effect (for example, by the use of UV-sensitive ink). More specifically, the decoration of chips is capable of fulfilling at least one of the many functions presented briefly below:

i) identifying the chip and/or chip value and/or casino and/or gambling table and/or player;
ii) providing decoration having an aesthetic character and/or acting as an advertising medium; and
iii) authenticating the chip and providing security against the risks associated with falsification and/or fraudulent reproduction.

With respect to the marking itself, it is possible to distinguish thickness or volume marking in the body of the chip (for example, marking within the bulk with or without insert, etching, multi-shot injection molding of the chip body made of plastic, etc.), from the marking of a surface (for example, printing using monochrome or polychrome screen printing). The invention relates more particularly to surface marking.

Among surface marking techniques for gambling chips, a so-called "sublimation" technique is known. According to this technique, which is illustrated in FIG. 3, a tracing paper, paper foil, screen or transfer (for example, made of paper or fabric) on which the pigmented layer or decoration (which may be multicolor) has been printed, generally by screen printing, is placed on one face of the chip or plastic body (step 1). The chip and tracing paper or transfer are then arranged in a hot press (step 2), the printed side of the transfer being pressed on the face of the chip. Through the application of heat, the ink of the transfer is sublimed so as to be deposited on the outer surface of the chip and to migrate into the plastic material of the chip to a depth of several tens of microns, the transfer paper acting as a retaining screen for the pigment vapors. Generally, the sublimation temperature of the colored pigments is between 140° C. and 180° C., depending on the colors and inks. The paper foil is then removed (step 3). This technique, which yields good results with respect to the adherence of the decoration, is not very accurate due to the passage by transfer, and is quite difficult to implement due, in particular, to the risks of deformation of the transfer paper during passage in the hot press. Furthermore, it requires subliming each face of the chip and the side separately (the sublimation of the side being achieved, for example, by heating the chips stacked in a supporting tube which is internally fitted with the transfer paper). Finally, it must be noted that the marking technique by sublimation is limited neither to gambling chips in general, nor to the marking support-objects having a body made of plastic (in this latter case, the body, for example, made of metal, is covered with a surface coating made of plastic, for example, a plastic varnish, prior to the sublimation).

The commonly owned published International Application WO-A-96/25066 and U.S. Pat. No. 5,794,532, the disclosure of which is hereby expressly incorporated by reference in its entirety, describes the use of pad-printing for the surface marking of the faces and/or the side of chips. More particularly, this document describes the marking of each face of the chip by pad-printing using an inked pad which is displaced coaxially with the chip with marking of the side with a inking pad-drum or, for chips having a soft-profiled side, a marking of a portion of the side corresponding to the chamfered or rounded edge of the face of the chip. This technique is very satisfactory with respect to the quality and accuracy of the decoration (pad-printing allowing half-tones or screen rulings of 175 against 100–120 by screen printing), but the decoration applied to the surface sometimes requires a protective varnish at the end of the chip manufacture.

SUMMARY OF THE INVENTION

The invention therefore provides a method for marking a decoration on a support-object made of plastic (or an object having a surface coating made of plastic), which combines pad-printing and sublimation. This makes it possible to improve the adherence and wear resistance of a pad-printed decoration, while maintaining the accuracy and good definition of the decoration generally obtained by the use of pad-printing. Among the difficulties to overcome, it is important to deposit the sublimable colored pigments by pad-printing on the surface to be marked, and to ensure, during sublimation, a deep penetration of a sufficient quantity of pigments into the material in order to obtain the desired coloration, while avoiding "smudges" due to the parasitic diffusion of the pigments on the surface.

To this end, the invention proposes a method for marking by pad-printing and sublimation a support-object made of plastic or having a surface coating made of plastic, characterized in that:

a pad-printing phase is utilized to deposit on the support-object (in one or more pad-printing operations) a monochrome or polychrome marking composition having at least one monocolor pigmented component that includes fine particles of at least one sublimable monocolor colored pigment. The composition incorporates a hardening component (which may be, without limitation, a curable component) and/or is coated with the hardening component. This hardening component is able to resist the sublimation temperature of the colored pigment(s) of the marking composition; and a sublimation phase is utilized for heating the support-object, the pad-printed marking composition, and, as the case may be, the hardening component incorporated into the composition and/or arranged as a coating. The heating is performed at a temperature that is at least equal to the sublimation temperature of the colored pigments. The hardening component has a hardening temperature lower than the sublimation temperature of the pigment(s) to obtain a progressive hardening of the hardening component prior to starting the sublimation of the colored pigment(s).

According to an alternative embodiment of the invention, the pad-printing phase includes placing on the support-object, in one or several pad-printing operations, a monochrome or polychrome marking composition having at least one monocolor pigmented component which includes fine particles of at least one sublimable monocolor colored pigment, followed by the coating of a hardening component resisting the sublimation temperature of the colored pigment(s).

According to a preferred embodiment of the invention, the hardening component is mainly constituted of a hardening transparent pad-printing ink base or of a similar compound.

Thus, the hardening component resisting the sublimation temperature of the pigments, and the progressive hardening of which occurs prior to the sublimation of all of the colored pigments that are present, forms a screen preventing the pigment vapors from escaping into the surrounding atmosphere and channels the vapors toward the surface of the support-object to be marked. The use of a transparent base of a pad-printing ink as a hardening component has shown that the transfer by pad-printing of the sublimable colored pigments on the surface to be marked was performed under good conditions. However, a similar compound capable of fulfilling the double function of acting as an agent for the transfer of the pigments by pad-printing and as a screen for the sublimable pigments is quite acceptable.

Of course, the invention is not limited to the marking of gambling chips, but relates (and/or is applicable) to all objects capable of receiving sublimable pigments, such as, for example, plastic objects or metal objects coated with a layer of plastic paint or with any appropriate material or coating. Similarly, by eliminating the transfer paper, it is possible to decorate multifaced objects in a single sublimation operation and/or objects having a more complex shape (with non-planar or non-developable surfaces).

According to a first alternative embodiment of the method according to the invention, the transparent pad-printing ink base or similar compound has, without additional hardening agent, a hardening temperature between approximately 60° C. and approximately 100° C., preferably on the order of approximately 80° C.

According to another alternative embodiment of the invention, the pigmented component is constituted of fine particles of sublimable monocolor colored pigments capable of being dispersed directly in the hardening component without binder(s). Advantageously, the method according to the invention includes at least one pad-printing operation of depositing a monocolor ink composition obtained by a mixture, without binder(s), of the pigment particles of a sublimable monocolor pigmented component and of the transparent pad-printing ink base, which may possibly be accompanied by a thinner. Advantageously, the pad-printing operation(s) can be followed by a sublimation heating carried out in a heating enclosure brought to a temperature between approximately 145° C. and approximately 160° C. for about ten minutes. A period of approximately 12 minutes at approximately 150° C. is preferably selected in order to obtain the best rendering between the various colors at the end of sublimation.

According to another alternative embodiment, the method is characterized by at least one pad-printing operation of depositing a monocolor ink composition obtained by a mixture of a sublimable monocolor pigmented component which is obtained by dispersing colored pigments in a binder and of the transparent pad-printing ink base possibly accompanied by a thinner. This pad-printing operation is followed by a sublimation heating carried out in a heating enclosure brought to a temperature on the order of approximately 130° C. for about ten minutes. It is noted that the sublimation temperature of certain pigments associated with inks with binders is lower than for the pigments associated with inks without binder, especially for certain inks with binder by the company ATS COLOR, which are sublimable between approximately 120° C. and approximately 130° C. This characteristic is used for the marking of plastic support-objects having low thickness (lower than or equal to approximately 1 mm) and/or low heat resistance.

In both cases (colored pigments with or without a binder), the plate used for the operation of depositing the monocolor ink composition by pad-printing is etched to a small depth, preferably on the order of approximately 20 μm–30 μm.

In an alternative embodiment, but still within the scope of the invention, the sublimation heating is obtained either by exposure to infrared radiation, or by using a heating membrane under vacuum.

Finally, depending on the desired surface state and/or aspect, the sublimation heating phase is followed by an operation adapted for the surface treatment and/or the partial or total elimination of the cured film of the transparent pad-printing ink base or of the similar compound.

By way of application of the method according to the invention, the method can be used for the marking of a decoration having one to four colors on a gambling chip made of plastic. In this way, the two faces and the side of the chip can be pad-printed prior to a single sublimation heating operation.

To guarantee uniformity of the colors for a series of objects after sublimation, the support-objects are displaced in the enclosure on an endless band at a constant speed, substantially along the same path.

Similarly, the sublimation heating operation can be carried out using a heating membrane under vacuum.

According to yet another alternative embodiment of the method, the sublimation heating phase is followed by an operation adapted for the surface treatment and/or the partial or total elimination of the cured film of the transparent pad-printing ink base or of the similar compound.

The method according to the invention is used advantageously for the marking of a decoration having one to four colors on a gambling chip made of plastic, such that the two faces and the side of the chip are pad-printed prior to a single sublimation heating operation.

Still according to another alternative embodiment of the invention, the body of the support object is made of plastic loaded with a mineral load, especially zinc oxide and/or Wollastonite fibers. Advantageously, the body of the support object is made of polyamide, polyester (especially PBT) or polyacetal (POM), or bears a coating constituted of a transparent or monochrome polyester varnish.

The invention also relates to sublimable pad-printing inks that can be used more particularly to implement the marking method described hereinabove and its various alternative embodiments, which include a hardening transparent pad-printing ink base, possibly accompanied by a thinner, and fine particles of at least one sublimable monocolor colored pigment. The transparent pad-printing ink base resists the sublimation temperature of the pigment(s) having a hardening temperature lower than the sublimation temperature of the pigment(s) in order to permit the beginning of a progressive hardening phase for the ink film prior to beginning the sublimation of the colored pigments.

According to a first variation of the ink according to the invention, the hardening transparent pad-printing ink base has, without additional curing agent, a hardening temperature between approximately 60° C. and approximately 100° C., preferably on the order of approximately 80° C. Advantageously, the ink base is mainly constituted of one or several acrylic compounds.

According to a first embodiment of the invention, the ink is obtained by mixing the hardening transparent pad-printing ink base, possibly accompanied by a thinner, with particles of sublimable monocolor colored pigments dispersed without binder. In a particular composition, the concentration of sublimable colored dried pigments is between approximately 4% and approximately 20% by weight of the final product, the complement being mainly constituted of the transparent pad-printing ink base and the thinner in a concentration between approximately 10% and approximately 25% by weight of the final product.

According to a second embodiment of the invention, the ink is obtained by mixing the transparent pad-printing ink base, possibly accompanied by a thinner, with a monocolor sublimable pigmented component having sublimable colored pigments dispersed in a liquid binder. Still within the scope of the invention, the sublimable pigmented component is constituted either by a pigmented preparation for sublimable ink that can be used for the offset printing of sublimation tracing papers or transfers, or by a pigmented preparation for sublimable ink that can be used for the screen printing of sublimation tracing papers or transfers.

Preferably, the ink of the invention, according to the second embodiment hereinabove, has a concentration of sublimable pigmented component with binder between approximately 20% and approximately 40% by weight of the final product, the complement being mainly constituted of the transparent pad-printing ink base and of the thinner in a concentration between approximately 10% and approximately 30% by weight of the final product.

Finally, the transparent pad-printing ink base advantageously has at least one additive or load providing it with non-slip and/or ink gloss attenuation properties (gloss reducing agent).

The invention also provides a method of marking an object comprising pad-printing the object with a marking comprising a monochrome or polychrome marking composition having at least one monocolor pigmented component comprising fine particles of at least one sublimable monocolor colored pigment and heating at least one of the object and the pad-printed marking composition.

The monochrome or polychrome marking composition may include at least one hardening component. The monochrome or polychrome marking composition may be coated with at least one hardening component. The at least one hardening component may resist a sublimation temperature of the at least one sublimable monocolor colored pigment. The pad-printing may comprise at least two pad-printing operations. The monochrome or polychrome marking composition may include at least one hardening component and wherein the heating comprises heating at least one of the object, the pad-printed marking composition, and the hardening component. The heating may comprise heating at a temperature at least equal to a sublimation temperature of the at least one sublimable monocolor colored pigment. The monochrome or polychrome marking composition may include at least one hardening component having a hardening temperature lower than the sublimation temperature of the at least one sublimable monocolor colored pigment, and the heating may comprise heating at least one of the object, the pad-printed marking composition, and the hardening component. The method may further comprise allowing the hardening component to be progressively hardened prior and thereafter subjecting to heating the at least one sublimable monocolor colored pigment.

The object may be made of a plastic. The object may comprise a surface coating made of plastic. Prior to heating, the method may further comprise coating the object with a hardening component that resists a sublimation temperature of the at least one sublimable monocolor colored pigment. Following the pad-printing, the method may further comprise coating the object with a hardening component that resists a sublimation temperature of the at least one sublimable monocolor colored pigment. The hardening component may be mainly comprised of a hardening transparent pad-printing ink base. The hardening transparent pad-printing ink base may lack an additional hardening agent and may have a hardening temperature in the range of between approximately 60° C. and approximately 100° C. The hardening temperature may be approximately 80° C.

The monochrome or polychrome marking composition may include at least one hardening component having a hardening temperature lower than the sublimation temperature of the at least one sublimable monocolor colored pigment and the hardening component may be mainly comprised of a hardening transparent pad-printing ink base. The hardening transparent pad-printing ink base may lack an additional hardening agent and has a hardening temperature in the range of between approximately 60° C. and approximately 100° C. The hardening temperature may be approximately 80° C. The monochrome or polychrome marking composition may include at least one hardening component having a hardening temperature lower than the sublimation temperature of the at least one sublimable monocolor colored pigment and the fine particles of at least one sublimable monocolor colored pigment may be capable of being dispersed directly in the hardening component without binder.

The method may further comprise mixing, without a binder, pigment particles of the at least one monocolor pigmented component with a transparent pad-printing ink base. The method may further comprise mixing, without a binder, pigment particles of the at least one monocolor pigmented component with a transparent pad-printing ink base and a thinner. The heating may comprise heating in a heating enclosure at a temperature in the range of between approximately 145° C. and approximately 160° C. for approximately ten minutes. The heating may comprise heating in a heating enclosure at a temperature of approximately 150° C. for approximately 12 minutes. The method may further comprise mixing pigment particles of the at least one monocolor pigmented component with a binder and a transparent pad-printing ink base. The mixing may include dispersing the fine particles of at least one sublimable monocolor colored pigment in the binder and the transparent pad-printing ink base.

The method may further comprise mixing pigment particles of the at least one monocolor pigmented component with a binder, a transparent pad-printing ink base, and a thinner. The mixing may include dispersing the fine particles of at least one sublimable monocolor colored pigment in the binder, the transparent pad-printing ink base, and the thinner. The heating may comprise heating in a heating enclosure at a temperature in the range of between approximately 120° C. and approximately 130° C. for approximately ten minutes. The pad-printing may utilize a pad-printing plate which is etched to a depth. The depth may be in the range of between approximately 20 µm and approximately 30 µm. The heating may comprise moving the object at a constant speed in the heating enclosure. The heating may comprise moving a plurality of object at a constant speed in the heating enclosure along substantially the same path. The heating may comprise heating with a heating membrane under vacuum.

After the heating, the method further comprise treating a surface of the object. The treating may comprise one of partial and total elimination of a hardened film on a surface of the object. The marking may comprise a decoration having between one and four colors. The object may comprise a gambling chip made of plastic. The method may further comprise pad-printing two faces and a side of the gambling chip and thereafter subjecting the gambling chip to the heating in a single step. The object may comprise a plastic that is loaded with a mineral filler. The mineral filler may comprise at least one of zinc oxide and Wollastonite fibers. The object may comprise at least one of a polyamide, a polyester, PBT, and polyacetal POM. The object may comprise a coating of transparent or monochrome polyester varnish.

The invention also provides for a sublimable pad-printing ink comprising a hardening transparent pad-printing ink base and at least one sublimable colored pigment, wherein the hardening transparent pad-printing ink base resists a sublimation temperature of the at least one sublimable colored pigment.

The hardening transparent pad-printing ink base may have a curing temperature approximately lower than a sublimation temperature of the at least one sublimable colored pigment. The hardening temperature may be adapted to permit a beginning of a phase of progressive hardening of an ink film prior to beginning a sublimation of the at least one sublimable colored pigment. The sublimable pad-printing ink may be adapted to be used to mark an object. The ink may further comprise a thinner. The hardening transparent pad-printing ink base may lack any additional curing agent. The hardening transparent pad-printing ink base may have a curing temperature in the range of between approximately 60° C. and approximately 100° C. The hardening transparent pad-printing ink base may have a curing temperature of approximately 80° C. The sublimable pad-printing ink may be mainly comprised of one or more acrylic compounds. The sublimable pad-printing ink may comprise a mixture of the hardening transparent pad-printing ink base and particles of the at least one sublimable colored pigment. The mixture may include a thinner. The mixture may include particles of the at least one sublimable colored pigment which are dispersed without binder. The mixture may lack a binder.

The at least one sublimable colored pigment may comprise a dried pigment. The at least one sublimable colored pigment may comprise a concentration in the range of between approximately 4% and approximately 20% by weight of a final product. The sublimable pad-printing ink may be mainly comprised of the hardening transparent pad-printing ink base. The ink may further comprise a thinner in a concentration of between approximately 10% and approximately 25% by weight of a final product. The ink may further comprise a mixture of monocolor sublimable pigmented component that includes fine particles of the at least one sublimable colored pigment dispersed in a liquid binder. The mixture may include a thinner. The sublimable pad-printing ink may be adapted to be used for offset printing of sublimation tracing papers or transfers. The sublimable pad-printing ink may be adapted to be used for screen printing of sublimation tracing papers or transfers.

A concentration of the monocolor sublimable pigmented component that includes the fine particles of the at least one sublimable colored pigment dispersed in the liquid binder may be in the range of between approximately 20% and approximately 40% by weight of a final product. The sublimable pad-printing ink may be mainly comprised of the hardening transparent pad-printing ink base and thinner in a concentration of between approximately 10% and approximately 30% by weight of the final product. The ink may further comprise at least one additive or filler that provides non-slip and/or gloss attenuation properties. The hardening transparent pad-printing ink base may comprise at least one additive or filler that provides non-slip and/or gloss attenuation properties to the hardening transparent pad-printing ink base.

The invention also provides for a method of marking an object having a surface made of plastic comprising pad-printing the surface with a marking comprising a monochrome or polychrome marking composition having at least one monocolor pigmented component comprising fine particles of at least one sublimable monocolor colored pigment and heating the surface and the pad-printed marking composition, wherein the monochrome or polychrome marking composition includes at least one hardening component, wherein the at least one hardening component resists a sublimation temperature of the at least one sublimable monocolor colored pigment, and wherein the heating comprises heating at a temperature at least equal to a sublimation temperature of the at least one sublimable monocolor colored pigment.

The invention also provides for a sublimable pad-printing ink comprising a hardening transparent pad-printing ink base and at least one sublimable colored pigment. The hardening transparent pad-printing ink base resists a sublimation temperature of the at least one sublimable colored pigment and having a curing temperature approximately lower than a sublimation temperature of the at least one sublimable colored pigment. The sublimable pad-printing ink is adapted to be used to mark an object.

BRIEF DESCRIPTION OF THE DRAWINGS

Other advantages and characteristics of the present invention will become apparent upon reading the following description, which is only provided by way of non-limiting example, with reference to the annexed drawings, in which:

FIG. 1 is a skeleton diagram of a pad-printing apparatus which can be used to practice the invention;

FIGS. 2a and 2b show an operation of pad-printing one face and the side of a gambling chip that falls within the marking method according to the invention, before marking (FIG. 2a) and during marking showing the compressed pad (FIG. 2b), respectively;

FIG. 3 illustrates a prior art method of marking by sublimation;

FIG. 4 illustrates one way to mark an object by sublimation according to the invention; and FIG. 5 illustrates another way to mark an object by sublimation according to the invention.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

As a preliminary observation, it is noted that all compositions and formulas in this specification are expressed in percentage by weight.

The method of marking by pad-printing and sublimation according to the invention is described here in an application to the marking of a gambling chip 10 (shown in a side view in FIGS. 1, 2a and 2b). The gambling chip 10 made of plastic (for example polyester, preferably polybutylene-terephthalate—PBT—possibly loaded with zinc oxide and Wollastonite fibers) has the general shape of a disk, with parallel faces 12 and 13 and a straight side 14.

The method of marking by pad-printing and sublimation according to the invention includes the following:

a pad-printing phase which includes placing, on a support-object (in this case the gambling chip made of plastic) in one or several pad-printing operations, a monochrome or polychrome marking composition having at least one monocolor pigmented component containing fine particles of at least one sublimable monocolor colored pigment and a hardening component resisting the sublimation temperature of the colored pigment(s) of the marking composition. By way of non-limiting example, a hardening component is used having a hardening transparent pad-printing ink base or a similar compound. The transparent ink base or similar compound has a hardening temperature lower than the sublimation temperature of the pigments in order to obtain a progressive hardening of the transparent ink base or of the similar compound prior to the sublimation of the colored pigment(s); and a sublimation heating phase. In this phase, the support-object, i.e., the chip, and/or the marking composition including the hardening component, is heated at a temperature at least equal to the sublimation temperature of the colored pigment(s).

The phase of pad-printing the chip (i.e., the faces and side) can be carried out using various types of devices, machines or apparatuses, whether conventional or otherwise. By way of non-limiting example, FIG. 1 illustrates the principle of a pad-printing apparatus that allows one of the faces and the side of a disk-shaped gambling chip or of an object of similar shape to be marked simultaneously. By way of example, the chip 10 has a diameter of approximately 40 mm and a side height or thickness of approximately 3 mm. The faces of such chips are generally planar and parallel, with a smooth surface or a slightly "granite-like" appearance (i.e., with micro-asperities).

Referring to FIG. 1, a horizontal base 30 is adapted to act as a support for the chip 10. An ink pad 34 is mounted on a frame 31 so as to be able to move in vertical reciprocating movements. The pad 34 has an axially symmetrical deformable head 36 of axis ZZ' made of synthetic material (for example a synthetic silicone rubber). In this case, the head 36 includes a conical end 38. As will be seen hereinafter, the deformable head 36 is adapted to bed down on the face 12 and the edge 16 of the chip 10 while the straight side 14 is being marked. A plate-holder 40, carrying a flat ink plate 11 which incorporates the image of a side decoration, is capable of sideways or horizontal reciprocating movements between the position vertically aligned with the pad 34 (position 40) and a position vertically aligned with a sublimable monocolor ink reservoir 41 shown hereinafter (position 40').

By way of example, the pad-printing operation itself may be carried out in the following manner. After inking the plate 11 (position 40'), the plate holder is moved into the position 40 coaxial with the pad 34, so as to arrange the ring-shaped zone (not shown) of the plate 11 coaxially with the pad 34. A first downward vertical movement of the pad 34 allows the ink to be picked up simply by applying pressure. After the pad 34 has been raised and the plate holder retracted (toward the position 40'), the pad 34 undergoes a second downward vertical movement in order to deposit the ink firstly by pressing on the face 12 of the chip 10 and then, by further deformation of the head of the pad 36, on the side 14. Marking the chip 10 with a monochrome (final or intermediate) decoration is thus achieved. In the case of a final decoration, reference is made to "flat" printing.

With respect to polychrome printing, more particularly four-color printing, with, e.g., yellow, cyan, magenta, and black as primary colors, the final decoration is formed by complementarity and/or superposition of monochrome decorations, each of these intermediate decorations being etched on a separate plate. In the case of polychrome marking, either several movable plate holders or a series of monochrome pad-printing units associated with a movable chip-holding base are used.

With respect to the etching depth of the various required plates, it is generally, as is the case for conventional pad-printing, between approximately 25 µm and approximately 30 µm, depending on the type of apparatus (open or closed inker) and the type of decoration to be marked (half-tone or non-half-tone). However, according to the invention, it is possible to reduce the etching depth to about 20 µm so as to only transfer the minimum amount of ink necessary to the sublimation, and to thus reduce the residual transparent base to a minimum.

It is noted at this stage of the disclosure that the color inks used in four-color printing are more pale, taking into account the superposition of four ink layers, than those used normally in monochrome printing on a single layer.

As may be seen in FIGS. 2a and 2b, the chip 10 is maintained centered on the ZZ' axis of the pad 34 by retractable vertical centering slides 32. These slides 32 have curved inner walls which are complementary with the side 14 of the chip 10. This centering system or operation, in the initial phase of the marking, is important in order to properly position the chip 10 in relation to the pad 38, especially so that the edge 16 is in precise correspondence with its inked image on the conical end 38 of the pad 34. After the conical end 38 has moved beyond the plane of the face 12, the centering slides 32 gradually retract (by way of any known mechanical arrangement) in order to allow the head of the pad 38 to deform along the side 14, while bedding down on the edge 16 until complete inking of the side 14 when the end 38 (which is conical at rest) of the deformable head 36 of the pad 34 is compressed (with the rim of the head 36 projecting slightly beyond the plane of the edge 17 of the lower face 13 of the chip 10). Finally, in order to prevent the chip 10 from lifting while the pad 34 is being retracted, an adhesive patch 42 is fixed to the base 30, the patch 42 being in contact with the lower face 13 of the chip 10.

After the marking and superficial drying of the face 12 and of the side 14 of the chip, the chip 10 is turned over for the marking of the face 13 and, in this case, the slides 32 are maintained in the raised position as shown in FIG. 2a.

With respect to the inks that can be used in the context of the present invention, two types of inks can be distinguished: inks with colored pigments that are mixed directly with the hardening transparent ink base (so-called inks without binder) and inks obtained by mixing the hardening transparent ink base with a liquid binder loaded with colored pigments (so-called inks with binder). Generally, the inks without binder are more difficult to prepare than the inks with binder, but they yield better results with respect to the intensity of the colors, which is higher, and to the clarity of the decoration design obtained in four-color printing (almost complete elimination of the lateral ink smudges). In practice, except for the volatile thinner, the presence of a notable percentage of a non-hardening component in an ink has the effect of reducing the intensity of the colors and of increasing the risks of causing smudges.

In order to avoid the placement of a superficial layer of hardening component (supplemental sub-operation) and to avoid having to eliminate a non-hardening ink base during the sublimation operation, it is advantageous to directly use a transparent ink base that can harden gradually at a temperature lower than the sublimation temperature of the associated colored pigments (between approximately 130° C. and approximately 180° C.); it being noted that the sublimation temperature can also vary with the type of material of the support (in particular, the Wollastonite fibers facilitate the diffusion of the sublimed pigments in the chip body made of PBT).

The main components of the inks without binder, ink bases, and pigments will now be described, as well as several ink compositions, by way of example.

The Ink Bases:

Generally, the pad-printing ink bases used have thermosetting properties.

The hardening transparent pad-printing ink base is selected so as to resist the sublimation temperature of the pigments, and so as to have, without additional hardening agent, a hardening temperature lower than the sublimation temperature of all of the colored pigments with which it is associated, for example, a hardening temperature on the order of approximately 80° C., compared to a sublimation temperature of the pigments generally comprised between approximately 130° C. and approximately 180° C. (180° C. corresponding to fluorescent inks).

Among the hardening transparent pad-printing ink bases that are commercially available and can be used in the present invention are:

A TO/10 ink base from the company PRINTING International (Belgium);

An R-type transparent pad-printing ink base from the company TAMPOPRINT GmbH (Korntal, Germany);

A pad-printing ink base from the company SERICOL (Trappes, France); and

A pad-printing ink base from the company TIFLEX (Poncin, France).

Generally speaking, acrylic resins (without hardening agent(s)) can be used as ink base in the context of the present invention.

Associated with these resins are the corresponding thinner (for example, the TO/10 A thinner for the TO/10 resin), on the one hand, and, possibly, a gloss reducing agent (for example, the gloss reducing agent marketed under the name AEROSIL 200 by the company DEGUSSA (Germany)) to attenuate the gloss of the hardened layer of ink base forming a varnish approximately 20 µm–80 µm thick.

It is noted that the thinner that is often adapted to a given transparent pad-printing ink base is generally available from the manufacturer of the base. The purpose of the thinner, in particular, is to place the ink in a state of optimum viscosity and, if necessary, to lighten the colored dye for the best possible transfer by pad-printing, and it also depends on the material used (especially on the pad) and the ambient conditions of the surrounding environment (temperature and humidity).

Of course, hardening, especially thermosetting compounds, similar to these hardening transparent pad-printing ink bases can be used in the context of the invention, especially compounds having a base of thermosetting polyesters (or their copolymers) resisting the sublimation temperature of the pigments and having a relatively low hardening temperature, insofar as these compounds are mixed without reaction with the sublimable pigmented preparation and allow the transfer of the pigmented mixture by pad-printing on the support to be decorated.

The Colored Pigments

All the colored pigments for ink without binder(s) are selected to be sublimable starting from approximately 145° C. and are used in the beginning in the form of fine particles of dried pigments. These pigments are subject to a thorough grinding, in particular by way of ball mills in order to obtain particles that are smaller than approximately one micron.

The yellow, magenta and cyan colored pigments marketed under the name SUBLAPRINT by the company AAKO-BV (Netherlands) have yielded good results. The same is true for the black colored pigments by the company KEYSTONE (Chicago, USA). It must be noted that black pigments can be either intrinsically black or can be obtained by mixing particles of three colors, yellow, red and cyan.

A dispersing agent, more particularly a dispersing agent marketed under the name DISPERBYK 161 by the company BYK-Chemie GmbH (Germany) and a gelling agent are also used in small quantity with these pigments in order to provide the inks of various colors with substantially the same viscosity.

Compositions of Inks without Binder(s) (Approximate Percent by Weight)

Satisfactory results have been obtained from the following general compositions:

| All Colors except Black: | |
| --- | --- |
| TO/10 Ink Base | 60%–70% |
| Dried Colored Pigments | 4%–10% |
| Dispersing Agent | 2.5%–5% |
| Gelling Agent | 2%–3% |
| Gloss Reducing Agent | 5%–7% |
| Thinner* | 9%–15% |

*(adjusted in sufficient quantity to obtain 100%)

| Black Color: | |
| --- | --- |
| TO/10 Ink Base | 48%–58% |
| Dried Colored Pigments | 13%–19% |
| Dispersing Agent | 7%–10% |
| Gelling Agent | 2%–3% |

-continued

| Black Color: | |
|---|---|
| Gloss Reducing Agent | 5%–5% |
| Thinner* | 10%–15% |

*(adjusted in sufficient quantity to obtain 100%)

The following should be noted: the minimum values of the colored pigments (including black) correspond to the low intensity color inks generally used in polychrome printing, and that the maximum values correspond to the "flat" monochrome color inks; the inks with black pigments (KEYSTONE) have on the average twice the load of pigments; and the concentration by weight of a dispersing agent is on the order of half of the concentration by weight of dried colored pigments.

By way of non-limiting examples, the composition in approximate percent by weight for a Dull Blue normally intended for four-color printing is as follows:

| | |
|---|---|
| Ink Base PRINTING TO/10 | 69.70% |
| Pigments Turquoise SUBLAPRINT 70075 | 4.50% |
| Dispersing Agent DISPERBYK 161 | 2.25% |
| Gelling Agent | 2.00% |
| Gloss Reducing Agent | 8.00% |
| Thinner* PRINTING TO/10 A | 13.55% |

*(adjusted in sufficient quantity to obtain 100%)

And the composition in approximate percent by weight for a Dull blue normally intended for single-color printing is as follows:

| | |
|---|---|
| Ink Base PRINTING TO/10 | 62.00% |
| Pigments Turquoise SUBLAPRINT 70075 | 9.50% |
| Dispersing Agent DISPERBYK 161 | 4.70% |
| Gelling Agent | 2.00% |
| Gloss Reducing Agent | 7.00% |
| Thinner* PRINTING TO/10 A | 14.80% |

*(adjusted in sufficient quantity to obtain 100%)

In practice, the colored pigments and dispersing and gelling agents are mixed, in ball mixers, with a quantity of resin on the order of half of the total quantity of resin until an intermediate preparation with fine and homogenous dispersion of the pigment is obtained. The resin complement with the gloss reducing agent and the thinner are mixed with the intermediate preparation to produce the final preparation with the desired viscosity, density (in this case approximately 1.080) and low-gloss.

Once the chip 10 is completely marked by pad-printing using inks with pigments that do not use a binder as described hereinabove, the sublimation phase is undertaken. To this end, the chip 10 is placed in an enclosure heated between approximately 145° C. and approximately 160° C. (in a properly ventilated rotating heat oven with air circulation) for a period of approximately ten minutes, in this case about 12 minutes at approximately 150° C. for a chip 10 made of PBT. Each chip 10 is positioned via four contact points on an endless circulating band so as to allow almost the same exposure to hot air for both faces of the chip, and the conveyor band move at a constant speed along an identical path for all of the chips of the same batch to ensure uniformity of the final decoration of the chips. In view of the level of hardening temperature of the transparent base, the progressive curing of the base occurs prior to the sublimation of the pigments. The base in an increasingly advanced hardening state resists this sublimation temperature and acts as a screen for the vapors of the pigments which can thus migrate into the material of the chip on the surface over one or two tens of microns. The screen effect is all the more remarkable in that the heat penetrates from the outer surface of the ink layer, and that the hardening is also progressive from the outside in an inwardly direction. It is noted that a too rapid complete hardening would result in trapping the pigments within the base, preventing almost any migration.

Very good results (bright colors and lack of lateral smudges) have been obtained using inks without binder of the type described hereinabove on PBT chips (loaded with zinc oxide and Wollastonite fibers) heated in the oven at approximately 150° C. for approximately 12 minutes.

In practice, tests must be conducted for each type of ink and each type of material of the chip body, by varying the oven temperature and the heating time.

Of course, if the heating temperature generally remains close to the sublimation temperature of the pigments (between approximately 130° C. and approximately 180° C.), the heating time can vary quite substantially as a function of the material of the chip, the pad-printing ink base used, the number and thickness of the ink layers, the type of pigments and the possible presence of a curing agent and/or fillers.

Without departing from the scope of the invention, other alternative embodiments may use different heating systems, for example, by exposure to infrared radiation (generally one-way heating adapted for face by face sublimation) or by using a flexible heating membrane under vacuum, in which the chip is positioned (heating over the entire outside of the chip).

Optionally, the hardened transparent ink base can be surface treated (mechanical or physico-chemical treatment) to modify its surface properties (non-slip treatment) or its visual aspect (gloss reduction), or can even be partially or completely eliminated generally by using an ink cleaning solvent.

The Inks with Binder:

According to the second particular embodiment of the invention (inks with binder), use is made of sublimable monocolor inks obtained by mixing a hardening transparent pad-printing ink base (of a similar compound) possibly accompanied by a thinner and a fluid pigmented preparation including sublimable colored pigments dispersed in a binder.

Among the commercially available sublimable pigmented preparations that can be used in the present invention, one can cite the pigmented sublimable preparations starting from approximately 130° C., which fall into the composition of sublimable inks that can be used for the offset or screen printing of sublimation tracing papers or transfers, especially the sublimable pigmented preparations by the company ATS COLOR (Bolzano Vicentino, Italy), and the sublimable pigmented preparations by the companies SERICOL and TIFLEX in France, it being noted that the "offset printing"-type preparations generally give the final decoration more luminosity than the "screen printing"-type preparations, and are advantageous for polychrome printing.

By way of example, a sublimable monocolor ink with binder according to the invention is advantageously used, with the following reference composition (in percent by weight of the final product or mixture):

Between approximately 20% and approximately 40% of sublimable monocolor pigmented preparation;
Between approximately 40% and approximately 65% of hardening transparent pad-printing ink base; and Between approximately 10% and approximately 35% of thinner for the transparent pad-printing ink base.

More particularly, and still by way of non-limiting example, a typical composition in approximate percent by weight using sublimation ink as a binder is provided below:

| | |
|---|---|
| Ink Base TAMPOPRINT R | 48.00% |
| Gloss Reducing Agent AEROSIL 200 | 1.50% |
| Offset Printing Sublimation Ink by ATS COLOR | 24.00% |
| Thinner* VDS 380 | 26.50% |

*(adjusted in sufficient quantity to obtain 100%)

The sublimation phase for chips marked with inks of the type having binder uses substantially the same type of oven as previously, with a slightly lower temperature (on the order of approximately 120° C.–130° C.) and a heating time in the oven of about ten minutes.

Generally, an insufficient heating time results in an incomplete sublimation (pale colors) and an overextended time of continuous heating causes "smudges" by lateral migration of the pigments into the material of the chip. An intermittent heating by successive periods of several minutes separated by a cooling interval can prove advantageous. By way of non-limiting example, interesting results have been obtained, among other things, with inks of the type with binder on PBT or POM with a marking composition according to the reference composition provided hereinabove, based on an "Offset"-type pigmented preparation by the company ATS COLOR, with a transparent pad-printing ink base of the R-type (without additional curing agent) by the company TAMPOPRINT, and with a thinner VDS 380 also furnished by the company TAMPOPRINT, with an etching depth of approximately 20 μm and curing times, in an enclosure heated at approximately 120° C. for approximately 8 minutes for PBT and approximately 12 minutes for POM. However, the colors obtained with inks with binder remain paler than those obtained with inks without binder. Moreover, the presence of binder tends to increase the risks of lateral smudges within the ink layer itself during its hardening. The main advantage of inks with binder results from the reduction in the sublimation temperature of the pigments compared to the inks without binder and, consequently, the possibility that they can be used on support-objects made of plastic that are thin (less than approximately one millimeter thick) and/or have low resistance to temperature, without risk of deformation of the support-object body during the sublimation phase.

Without leaving the scope of the invention, the reference marking composition for inks with or without binder can be modified depending on the desired effects and the particular conditions encountered:

firstly, an additional hardening agent is associated with the transparent pad-printing ink base up to a proportion by weight of approximately one (1) part of hardening agent for approximately four (4) parts of base. This agent has the effect of reducing the hardening temperature of the resulting mixture and possibly the sublimation heating time. The hardening agent also has the effect of creating a hard and glossy layer of hardened base on the marking surface and can thus provide an advantageous protection for certain decorations, especially photo-type decorations in four-color printing. However, this hardened layer is generally quite slippery. For example, the hardening agent of the LMN 1 type by the company TAMPOPRINT can be used with the transparent base of the R-type by the same company.

secondly, additives or fillers are added to the monocolor pad-printing ink to provide a non-slip property to the surface of the final decoration and/or to reduce its glossy aspect; to this end, fine mineral powders, glass or silica balls, or other gloss reducing agents are used.

With reference to FIGS. 4 and 5, there are illustrated ways in which an object can be marked according to the invention. The invention is based on the association of a hardening component to a pad-printable marking composition incorporating sublimable momocolor colored pigment(s). The hardening component may either be included in or within (e.g., mixed with) the pad-printed marking composition (as exemplified in FIG. 4) or arranged on (e.g., coated on) top of the pad-printed marking composition (as exemplified in FIG. 5). In the method exemplified in FIG. 4, the hardening component produces a retaining screen effect as will be more fully described hereinafter. In either example, the hardening temperature of the hardening component is made lower than the sublimination temperature of the sublimable pigment(s) so that, at the start of the heating phase, the hardening component will begin to harden in a layer. This hardening occurs in the area closest to the source of heat. Thus, the hardening component layer will begin to harden starting from the outer side of the layer (i.e., the side more exposed to heat, with the side being protected by the plastic body). The result is the creation of a hardened layer having an outer portion that is harder than its inner portion.

In the method shown in FIG. 4, which is preferred, a single layer is used to mark the object in which the marking layer includes the hardening component. At the start of the heating phase, the marking layer is hardened unevenly with the outer portion being hardened to a higher extent that inner portion, i.e., this is because the hardening component of the marking layer begins to harden before sublimation occurs. The result is that a screen is created on the top of the marking layers and that the pigment vapors are more or less forced to migrate within the plastic object (or plastic surface thereof). This results in an efficiency of approximately 70% (70% of the pigmented material deposited by pad marking being actually transferred into the plastic body). As shown in FIG. 4, the first stage involves pad-printing the marking composition on the object or body. In stage two, heat is applied to cause the marking composition, including the pigment(s) to penetrate into the object or body, which is shown in stage three.

In the method shown in FIG. 5, a hardening component layer (which is resistant at the sublimation temperature of the sublimable pigment(s)) acts as the paper foil or screen (shown in the prior art method of FIG. 3). Of course, the hardening component layer is not totally pigment-vapor-proof (some percentage of pigmented vapors at the end of the sublimination state escape towards the atmosphere or remain trapped within the hardening component layer which reduces, correspondingly, the efficiency or transfer rate of the sublimable pigment(s) to the plastic object or body). As shown in FIG. 5, the first stage involves pad-printing the marking composition on the object or body with the marking composition having two distinct layers, i.e., an upper hardening component layer and a lower pigment(s) layer. In stage two, heat is applied to cause the pigment(s) to penetrate into the object or body, which is shown in stage three. Finally, any residual hardening layer is removed from the object or body.

It is noted that without leaving the scope of the invention, the marking method according to the invention also provides, for the pad-printing phase, the separate pad-printing of the monocolor pigmented components (associated with any agent of transfer by pad-printing), followed by the deposit by pad-printing of an outer layer of the hardening component.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method of marking an object comprising:
   pad-printing the object with a marking comprising one of a monochrome or polychrome marking composition having at least one monocolor pigmented component comprising fine particles of at least one sublimable monocolor colored pigment; and
   heating at least one of the object and the pad-printed marking composition,
   wherein the heating comprises sublimation heating which progressively cures a base prior to sublimation the fine particles of the at least one sublimable monocolor colored pigment, whereby the base acts as a screen for pigment vapors which migrate into a surface of the object, and whereby the base channels the pigment vapors towards the surface of the object so as to migrate into the surface.

2. The method of claim 1, wherein the monochrome or polychrome marking composition includes at least one hardening component.

3. The method of claim 1, wherein the monochrome or polychrome marking composition is coated with at least one hardening component.

4. The method of claim 3, wherein the at least one hardening component resists a sublimation temperature of the at least one sublimable monocolor colored pigment.

5. The method of claim 1, wherein the pad-printing comprises at least two pad-printing operations.

6. The method of claim 1, wherein the one of monochrome or polychrome marking composition includes at least one hardening component and wherein the heating comprises heating at least one of the object, the pad-printed marking composition, and the hardening component.

7. The method of claim 1, wherein the heating comprises heating at a temperature at least equal to a sublimation temperature of the at least one sublimable monocolor colored pigment.

8. The method of claim 1, wherein the object is made of a plastic.

9. The method of claim 1, wherein the object comprises a surface coating made of plastic.

10. The method of claim 1, further comprising mixing, without a binder, pigment particles of the at least one monocolor pigmented component with the base, wherein the base is a transparent pad-printing ink base.

11. The method of claim 1, further comprising mixing, without a binder, pigment particles of the at least one monocolor pigmented component with the base and a thinner, wherein the base is a transparent pad-printing ink base.

12. The method of claim 1, wherein the heating comprises heating in a heating enclosure at a temperature in the range of between approximately 145° C. and approximately 160° C. for approximately ten minutes.

13. The method of claim 1, wherein the heating comprises heating in a heating enclosure at a temperature of approximately 150° C. for approximately 12 minutes.

14. The method of claim 1, further comprising mixing pigment particles of the at least one monocolor pigmented component with a binder and the base, wherein the base is a transparent pad-printing ink base.

15. The method of claim 14, wherein the mixing includes dispersing the fine particles of at least one sublimable monocolor colored pigment in the binder and the transparent pad-printing ink base.

16. The method of claim 1, further comprising mixing pigment particles of the at least one monocolor pigmented component with a binder, the base, and a thinner, wherein the base is a transparent pad-printing ink base.

17. The method of claim 16, wherein the mixing includes dispersing the fine particles of at least one sublimable monocolor colored pigment in the binder, the transparent pad-printing ink base, and the thinner.

18. The method of claim 1, wherein the heating comprises heating in a heating enclosure at a temperature in the range of between approximately 120° C. and approximately 130° C. for approximately ten minutes.

19. The method of claim 1, wherein the pad-printing utilizes a pad-printing plate which is etched to a depth.

20. The method of claim 19, wherein the depth is in the range of between approximately 20 µm and approximately 30 µm.

21. The method of claim 1, wherein the heating comprises moving the object at a constant speed in the heating enclosure.

22. The method of claim 21, wherein the heating comprises moving a plurality of objects at a constant speed in the heating enclosure along substantially the same path.

23. The method of claim 1, wherein the heating comprises heating with a heating membrane under vacuum.

24. The method of claim 1, wherein, after the heating, the method further comprises treating a surface of the object.

25. The method of claim 24, wherein the treating comprises one of partial and total elimination of a cured film on a surface of the object.

26. The method of claim 1, wherein the marking comprises a decoration having between one and four colors.

27. The method of claim 1, wherein the object comprises a gambling chip made of plastic.

28. The method of claim 27, further comprising pad-printing two faces and a side of the gambling chip and thereafter subjecting the gambling chip to the heating in a single step.

29. The method of claim 1, wherein the object comprises a plastic that is loaded with a mineral filler.

30. The method of claim 29, wherein the mineral filler comprises at least one of zinc oxide and Wollastonite fibers.

31. The method of claim 1, wherein the object comprises at least one of a polyamide, a polyester, PBT, and polyacetal POM.

32. The method of claim 1, wherein the object comprises a coating of transparent or monochrome polyester varnish.

33. The method of claim 1, wherein the monochrome or polychrome marking composition is coated with at least one hardening component made of a hardening material.

34. A method of marking an object comprising:
pad-printing the object with a marking comprising one of a monochrome or polychrome marking composition having at least one monocolor pigmented component comprising fine particles of at least one sublimable monocolor colored pigment, wherein the one of monochrome or polychrome marking composition includes at least one hardening component having a hardening temperature lower than the sublimation temperature of the at least one sublimable monocolor colored pigment; and
heating, at a temperature at least equal to a sublimation temperature of the at least one sublimable monocolor colored pigment, at least one of the object, the pad-printed marking composition, and the hardening component.

35. The method of claim 34, further comprising allowing the hardening component to be progressively hardened prior and thereafter subjecting to heating the at least one sublimable monocolor colored pigment.

36. The method of claim 34, wherein the object comprises a gambling chip made of plastic and wherein the pad-printing comprises pad-printing two faces and a side of the gambling chip and thereafter subjecting the gambling chip to the heating in a single step.

37. A method of marking an object comprising:
pad-printing the object with a marking comprising one of a monochrome or polychrome marking composition having at least one monocolor pigmented component comprising fine particles of at least one sublimable monocolor colored pigment;
coating the pad-printed marking composition with a hardening component that resists a sublimation temperature of the at least one sublimable monocolor colored pigment; and
after the coating, heating at least one of the object, the hardening component, and the pad-printed marking composition.

38. The method of claim 37, wherein the object comprises a gambling chip made of plastic and wherein the pad-printing comprises pad-printing two faces and a side of the gambling chip and, after coating the pad-printed marking composition, subjecting the gambling chip to the heating in a single step.

39. A method of marking an object comprising:
pad-printing the object with a marking comprising one of a monochrome or polychrome marking composition having at least one monocolor pigmented component comprising fine particles of at least one sublimable monocolor colored pigment;
following the pad-printing, coating the object with a hardening component that resists a sublimation temperature of the at least one sublimable monocolor colored pigment; and
after the coating, heating at least one of the object, the hardening component, and the pad-printed marking composition.

40. The method of claim 39, wherein the hardening component is mainly comprised of a base and the base is a hardening transparent pad-printing ink base.

41. The method of claim 40, wherein the hardening transparent pad-printing ink base lacks an additional hardening agent and has a hardening temperature in the range of between approximately 60° and approximately 100° C.

42. The method of claim 41, wherein the hardening temperature is approximately 80° C.

43. A method of marking an object comprising:
pad-printing the object with a marking comprising one of a monochrome or polychrome marking composition having at least one monocolor pigmented component comprising fine particles of at least one sublimable monocolor colored pigment, wherein the one of monochrome or polychrome marking composition includes at least one hardening component having a hardening temperature lower than the sublimation temperature of the at least one sublimable monocolor colored pigment and wherein the hardening component is mainly comprised of a hardening transparent pad-printing ink base; and
heating at least one of the object and the pad-printed marking composition.

44. The method of claim 43, wherein the hardening transparent pad-printing ink base lacks an additional hardening agent and has a hardening temperature in the range of between approximately 60° C. and approximately 100° C.

45. The method of claim 44, wherein the hardening temperature is approximately 80° C.

46. A method of marking an object comprising:
pad-printing the object with a marking comprising one of a monochrome or polychrome marking composition having at least one monocolor pigmented component comprising fine particles of at least one sublimable monocolor colored pigment, wherein the one of monochrome or polychrome marking composition includes at least one hardening component having a hardening temperature lower than the sublimation temperature of the at least one sublimable monocolor colored pigment and wherein the fine particles of at least one sublimable monocolor colored pigment are capable of being dispersed directly in the hardening component without and
heating at least one of the object and the pad-printed marking composition.

47. A method of marking an object having a surface made of plastic comprising:
pad-printing the surface with a marking comprising one of a monochrome or polychrome marking composition having at least one monocolor pigmented component comprising fine particles of at least one sublimable monocolor colored pigment; and
heating the surface and the pad-printed marking composition,
wherein the one of monochrome or polychrome marking composition includes at least one hardening component,
wherein the at least one hardening component resists a sublimation temperature of the at least one sublimable monocolor colored pigment, and
wherein the heating comprises heating at a temperature at least equal to a sublimation temperature of the at least one sublimable monocolor colored pigment.

* * * * *